(12) United States Patent
Tetu et al.

(10) Patent No.: US 9,768,645 B2
(45) Date of Patent: Sep. 19, 2017

(54) SYSTEM FOR TRANSFERRING ENERGY BY ELECTROMAGNETIC COUPLING

(71) Applicant: Commissariat à l'énergie atomique et aux énergies alternatives, Paris (FR)

(72) Inventors: Yann Tetu, Genas (FR); Sylvain Bacquet, Chasselay (FR); Thierry Thomas, Varces Allieres et Risset (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 724 days.

(21) Appl. No.: 14/349,279

(22) PCT Filed: Oct. 3, 2012

(86) PCT No.: PCT/FR2012/052233
§ 371 (c)(1),
(2) Date: Apr. 2, 2014

(87) PCT Pub. No.: WO2013/050699
PCT Pub. Date: Apr. 11, 2013

(65) Prior Publication Data
US 2014/0285016 A1    Sep. 25, 2014

(30) Foreign Application Priority Data
Oct. 3, 2011    (FR) ..................... 11 58916

(51) Int. Cl.
*H02J 17/00*    (2006.01)
*H02J 7/00*    (2006.01)
*H02J 7/02*    (2016.01)
*H02J 5/00*    (2016.01)

(52) U.S. Cl.
CPC ............. *H02J 17/00* (2013.01); *H02J 5/005* (2013.01); *H02J 7/0027* (2013.01); *H02J 7/025* (2013.01); *Y10T 307/406* (2015.04)

(58) Field of Classification Search
CPC ........................................................ H02J 17/00
USPC .............................................................. 307/31
See application file for complete search history.

(56) References Cited

U.S. PATENT DOCUMENTS

| | | |
|---|---|---|
| 2005/0194930 A1 | 9/2005 | Barbeau et al. |
| 2007/0223217 A1 | 9/2007 | Hsu |

(Continued)

FOREIGN PATENT DOCUMENTS

| | | |
|---|---|---|
| EP | 0704814 | 7/2002 |
| EP | 2066001 | 6/2009 |

(Continued)

OTHER PUBLICATIONS

International Search Report issued Feb. 6, 2013, by the European Patent Office.

(Continued)

*Primary Examiner* — Joseph Chang
(74) *Attorney, Agent, or Firm* — Kevin R. Erdman; Brannon Sowers & Cracraft PC

(57) ABSTRACT

The invention relates to a device (1) for emitting energy by electromagnetic coupling which comprises: a single generator (5) outputting an AC electric signal between two terminals; a series of resonant modules (2i) each including a capacitor and a first inductance, and first to fourth terminals (Ai, Bi, Ci, Di), the first (Ai) and second (Bi) terminals of a first module being connected to terminals of the generator, and the first (Ai) and second (Bi) terminals of the other module or modules being connected to the third (Ci) and fourth (Di) terminals of the module of the previous row.

14 Claims, 4 Drawing Sheets

(56) References Cited

U.S. PATENT DOCUMENTS

| | | |
|---|---|---|
| 2009/0072627 A1 | 3/2009 | Cook et al. |
| 2009/0072628 A1 | 3/2009 | Cook et al. |
| 2009/0079268 A1 | 3/2009 | Cook et al. |
| 2009/0111531 A1 | 4/2009 | Cui et al. |
| 2009/0140691 A1 | 6/2009 | Jung |
| 2010/0096934 A1 | 4/2010 | Joannopoulos et al. |
| 2010/0124050 A1 | 5/2010 | Hau et al. |
| 2010/0164296 A1 | 7/2010 | Kurs et al. |
| 2011/0199028 A1 | 8/2011 | Yamazaki et al. |
| 2013/0307347 A1* | 11/2013 | Davila .................... H02J 5/005 307/104 |

FOREIGN PATENT DOCUMENTS

| | | |
|---|---|---|
| EP | 2256895 | 12/2010 |
| EP | 2066000 | 11/2012 |
| WO | 8301006 | 3/1983 |
| WO | 2006055900 | 5/2006 |
| WO | 2007008646 | 1/2007 |
| WO | 2008030376 | 3/2008 |
| WO | 2008137996 | 11/2008 |
| WO | 2009023155 | 5/2009 |
| WO | 2010093719 | 8/2010 |

OTHER PUBLICATIONS

International Searching Authority, Written Opinion, Feb. 2, 2014 (PCT/FR2012/052233).

\* cited by examiner

SYSTEM FOR TRANSFERRING ENERGY BY ELECTROMAGNETIC COUPLING

CROSS-REFERENCE TO RELATED APPLICATIONS

The present application is a national stage of PCT International Patent Application Serial Number PCT/FR2012/052233, filed Oct. 3, 2012, which claims priority under 35 U.S.C. §119 of French Patent Application Serial Number 1158916, filed Oct. 3, 2011, the disclosures of which are incorporated by reference herein.

BACKGROUND OF THE INVENTION

Field of the Invention

The present disclosure relates to wireless power transfer by electromagnetic coupling. It more specifically relates to a transmission device capable of simultaneously electrically powering a plurality of electronic devices.

Description of the Related Art

Systems where an electromagnetic field provided by a transmission device (transmitter) is used to electrically power an electronic device (receiver) are known. The receiver for example is a lamp, a wireless phone, an electric toothbrush, an electronic tag, a medical implant, or any other device capable of being remotely supplied. The transmitter comprises an A.C. signal generator connected to a conductive winding forming an antenna, and electronic components such as capacitors or resistors performing frequency tuning and impedance matching functions. The receiver comprises a conductive winding forming an antenna and components performing frequency tuning, impedance matching, and rectification functions. To optimize the power transfer, the antenna circuits of the transmitter and of the receiver should be sized according to the receiver. The main parameters are the number of turns of the conductive windings forming the transmit and receive antennas, the dimensions of the antennas, and the distance between the transmit antenna and the receive antenna.

As an example, in a conventional representation, the transmitter is modeled as a series resonant circuit $R_E L_E C_E$ connected to an A.C. signal generator, and the receiver is modeled as a parallel resonant circuit $R_R L_R C_R$. Resistance $R_E$ corresponds to the resistance of the antenna circuit of the transmitter, that is, to the sum of the specific resistance of the antenna and of a possible added impedance matching resistance, inductance $L_E$ corresponds to the inductance of the transmitter antenna, and capacitor $C_E$ corresponds to a transmitter resonance frequency tuning capacitance. Resistance $R_R$ corresponds to the load formed by the receiver device on the antenna circuit of the receiver, inductance $L_R$ corresponds to the inductance of the receiver antenna, and capacitor $C_R$ corresponds to a capacitance for tuning the receiver resonance frequency.

In practice, the voltage level obtained, on the receiver side, across capacitor $C_R$, depends (among other parameters, such as the size of the antennas, their characteristics, and the transmit power) on the distance between the transmit antenna and the receive antenna. The relation between the distance between antennas and the voltage level on the receiver side is generally not monotonous. The transmit and receive circuits are sized to allow an optimal power transfer at a nominal distance between the receiver and the transmitter.

Systems where a magnetic field provided by a transmitter is used to simultaneously electrically power a plurality of receiver devices are more specifically considered herein.

A system where the transmitter comprises a single antenna powering a plurality of receivers has already been provided. Such a system has the advantage of having a simple design, but does not allow an optimized power transfer between the transmitter and the receivers.

A system where the transmit device comprises a plurality of transmit antennas, each antenna being specifically tuned with a receiver, has also been provided in patent application US20090140691. The transmit device comprises control and switching circuits enabling to active/deactivate certain antennas. Further, wireless communication means are provided between the transmit device and the receivers, enabling receivers to notify their presence to the transmit device. When the transmit device detects the presence of a receiver, the corresponding antenna circuit of the transmit device is activated. When the receiver is drawn away from the transmit device, the corresponding antenna circuit is deactivated. Such a system allows an optimized power transfer between the transmit device and each of the receivers, but has the disadvantage that the transmit device is relatively complex.

SUMMARY OF THE INVENTION

Thus, an object of an embodiment of the present invention is to provide a device of power transmission by electromagnetic coupling capable of simultaneously electrically powering a plurality of receivers, the device overcoming all or part of the disadvantages of known devices.

An object of an embodiment of the present invention is to provide such a device allowing an optimized power transfer between the transmitter and the receivers.

An object of an embodiment of the present invention is to provide a power transfer device which is easy to form.

An object of an embodiment of the present invention is to provide a device of power transmission by electromagnetic coupling, enabling to simultaneously recharge a plurality of luminous ornaments such as candles or light-emitting diode balls.

Thus, an embodiment of the present invention provides a device of power transmission by electromagnetic coupling, comprising: a single generator providing an A.C. electric signal between two terminals; a succession of resonant modules, each comprising a first capacitor and a first inductance, and first to fourth terminals, the first and second terminals of a first module being connected across the generator, and the first and second terminals of the other module(s) being connected to the third and fourth terminals of the module of previous rank.

According to an embodiment of the present invention, two consecutive resonant modules are interconnected by a two-wire connection.

According to an embodiment of the present invention, the two-wire connection comprises a pair of adjoining wires.

According to an embodiment of the present invention, the two-wire connection comprises a twisted pair of wires.

According to an embodiment of the present invention, in each module, the first capacitor and the first inductance are series-connected between the first and third terminals, the second and fourth terminals being interconnected.

According to an embodiment of the present invention, each module further comprises a second capacitor connected in parallel with the first inductance.

According to an embodiment of the present invention, in each module, the first capacitor and the first inductance are connected in parallel between the first and second terminals, the first and third terminals being interconnected, and the second and fourth terminals being interconnected.

According to an embodiment of the present invention, each module further comprises a second capacitor between the first terminal and the node common to the first capacitor and to the first inductance.

According to an embodiment of the present invention, in each module, the first capacitor and the first inductance are series-connected between the first and second terminals, the first and third terminals being interconnected, and the second and fourth terminals being interconnected.

According to an embodiment of the present invention, the successive modules are connected so that, in each module, the current flow direction in the inductance changes with respect to the current flow direction in the inductance of the module of previous rank.

Another embodiment of the present invention provides a receiver comprising a resonant circuit comprising at least one capacitor and at least one inductance, said circuit being capable of electrically powering a load, in the presence of an electromagnetic field emitted by a power transmission device of the above-mentioned type.

Another embodiment of the present invention provides a system of power supply by electromagnetic coupling, comprising: a power transmission device of the above-mentioned type; and at least two receivers, each comprising a resonant circuit comprising at least one capacitor and at least one inductance.

According to an embodiment of the present invention, the power supply system is capable of recharging, by electromagnetic coupling, luminous ornaments.

According to an embodiment of the present invention, the system further comprises means for maintaining a predefined relative position between each receiver and the power transmission device, this position being selected to obtain an optimal coupling between the resonant circuit of the receiver and a resonant module of the power transmission device.

According to an embodiment of the present invention, the positioning means comprise a wall in the shape of a hollow cylinder.

According to an embodiment of the present invention, the wall supports conductive windings forming the inductances of the resonant modules.

According to an embodiment of the present invention, the power transmission device further comprises means for measuring the output current or voltage of the generator; deducing therefrom the number of receivers coupled to the device; and accordingly adjusting the output characteristics of the generator, to maintain a constant power transfer towards the receivers, independently from the number of receivers.

Another embodiment of the present invention provides using the above-mentioned power transmission device, to simultaneously electrically power at least two receiver devices each comprising a resonant circuit comprising at least one capacitor and at least one inductance.

BRIEF DESCRIPTION OF THE DRAWINGS

The foregoing and other objects, features, and advantages will be discussed in detail in the following non-limiting description of specific embodiments in connection with the accompanying drawings, among which.

DESCRIPTION OF EMBODIMENTS OF THE PRESENT INVENTION

Figure 1:
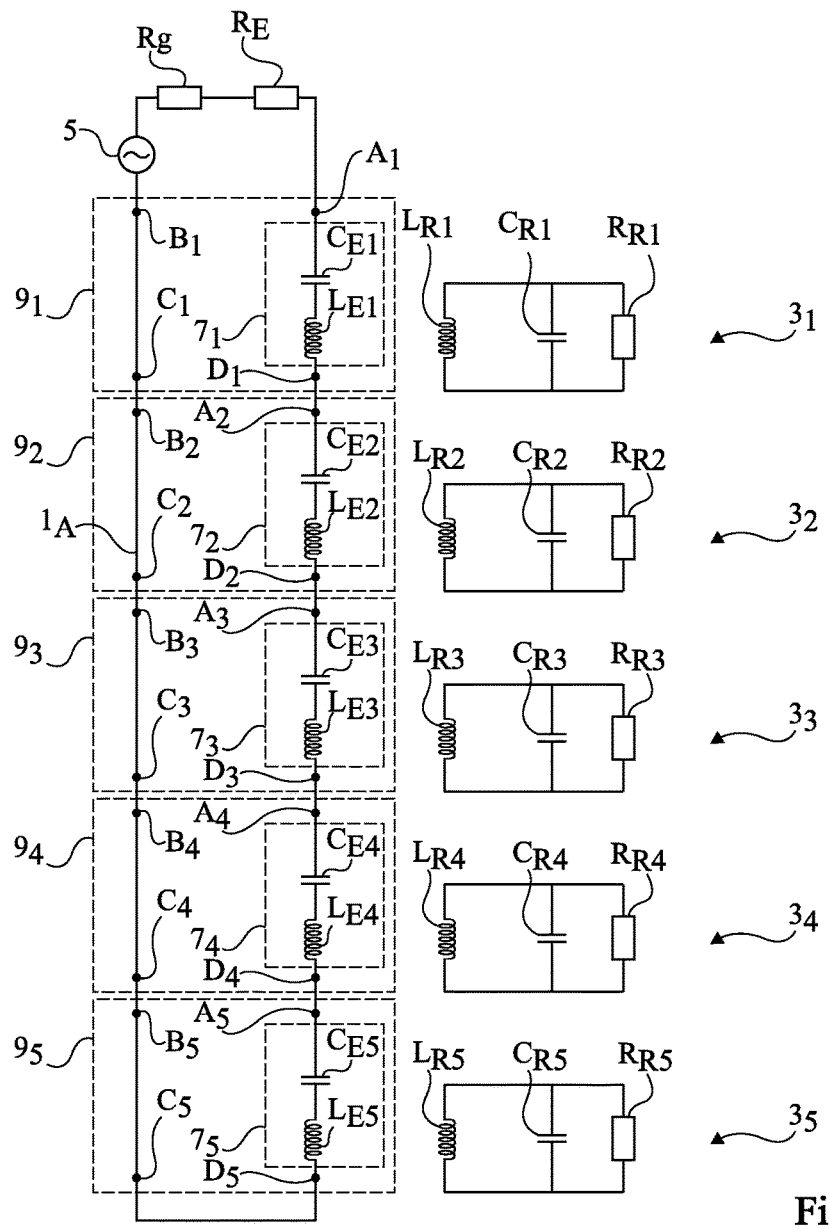
FIG. 1 is an electric diagram of an embodiment of a system comprising: a power transmission device capable of simultaneously electrically powering a plurality of receivers; and corresponding receivers.

For clarity, the same elements have been designated with the same reference numerals in the various drawings and, further, the various drawings are not to scale. Further, for clarity, only those elements which are useful to the understanding of the invention have been shown and will be described.

FIG. 1 is an electric diagram showing an embodiment of a system comprising:
a power transmission device $1_A$ capable of simultaneously electrically powering a plurality of receivers; and
corresponding receivers (five receivers $3_1$ to $3_5$ in this example).

Power transmission device $1_A$ comprises a single A.C. signal generator 5, for example, a radio frequency generator (RF) and, across generator 5, a succession of series-connected antenna circuits $7_1$ to $7_5$. Each antenna circuit $7i$ (i being in the range from 1 to 5 in this example) comprises a capacitor $C_{Ei}$, in series with an inductance $L_{Ei}$ representing the inductance of a conductive winding forming an antenna. In the diagram of FIG. 1, a resistor $R_E$ has been shown, connected between generator 5 and the succession of antenna circuits $7_1$ to $7_5$. Resistance $R_E$ corresponds to the sum of specific resistances $R_{Ei}$ of antennas $L_{Ei}$ and of a possible impedance matching resistance. A resistor $R_g$, series-connected with resistor $R_E$, corresponds to the internal resistance, or output impedance, of generator 5. In other words, device $1_A$ comprises, across generator 5, a succession of resonant modules $9_i$, with i ranging from 1 to 5 in this example, each comprising at least one capacitor and at least one conductive winding or inductance forming an antenna. First and second terminals $A_1$ and $B_1$ of module $9_1$ are connected across generator 5. In this example, terminal $B_1$ is connected or directly linked to a first terminal of the generator, and terminal $A_1$ is connected to a second terminal of the generator via resistors $R_g$ and $R_E$. First and second terminals of the other modules (respectively $A_2$ and $B_2$; $A_3$ and $B_3$; $A_4$ and $B_4$; and $A_5$ and $B_5$) are connected to third and fourth terminals of the module of previous rank (respectively $C_1$ and $D_1$; $C_2$ and $D_2$; $C_3$ and $D_3$; and $C_4$ and $D_4$). Third and fourth terminals $C_5$ and $D_5$ of the last resonant module, that is, module $9_5$ in this example, are interconnected by a short-circuit.

In the shown example, each of receivers $3_i$ is modeled as a parallel resonant circuit $R_{Ri}L_{Ri}C_{Ri}$. Resistance $R_{Ri}$ corresponds to the load formed by the receiver device on the antenna circuit of the receiver (this load may comprise passive and/or active electronic circuits, a battery, etc.), inductance $L_{Ri}$ corresponds to the inductance of a conductive winding forming the receiver antenna, and capacitor $C_{Ri}$ corresponds to a capacitance for tuning the receiver resonance frequency.

In operation, that is, during a phase of remote-supply of receivers $3_1$ to $3_5$, receivers $3_1$ to $3_5$ are respectively positioned in the vicinity of antenna circuits $7_1$ to $7_5$ of power transmission device $1_A$, so that receive antennas $L_{R1}$ to $L_{R5}$ respectively are in the field of transmit antennas $L_{E1}$ to $L_{E5}$. In a preferred embodiment, mechanical means (for example, a multi-location docking station) are provided to maintain the receive devices in a position such that the receive antennas are at a nominal distance from the transmit antennas, thus allowing an optimal power transfer between the transmitter and the receivers. The nominal distance between the transmit and receive antennas is for example in the range from 1 to 10 centimeters. More generally, the nominal distance between the transmit antennas and the receive antennas is for example in the range from 0 to 0.5 times the average equivalent diameter of the transmit and receive antenna circuits. Equivalent diameter D of an antenna circuit is defined according to surface S delimited by the external contour of the antenna, according to the following equation: $S=D^2*\pi/4$.

In such a system, in each antenna circuit $7_i$ of the power transmission device, capacitor $C_{Ei}$ and inductance $L_{Ei}$ form a self-resonant assembly LC. An advantage is that each self-resonant LC assembly can be sized to be specifically tuned (for example, frequency-tuned) with one of receivers $3_i$, which allows an optimized power transfer from the transmitter to the receivers.

Device 1 further has the advantage of being simple to form since it comprises a single A.C. signal generator, and comprises no switching or antenna circuit activation/deactivation electronic circuit.

As will be explained in further detail hereafter, the power transmission circuit is sized by taking into account the number of receivers capable of being simultaneously remote-supplied, and the receiver characteristics.

Figure 2:
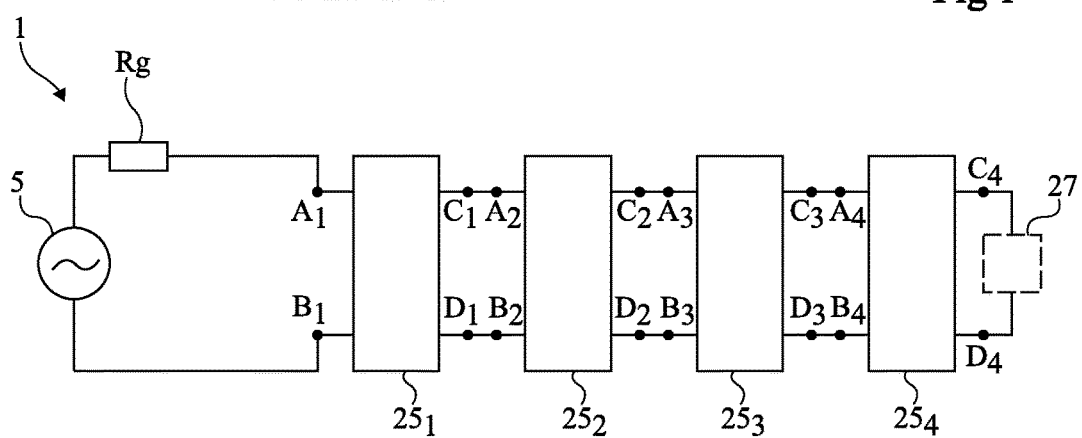
FIG. 2 is a simplified representation of an embodiment of a power transmission device capable of simultaneously electrically powering a plurality of receivers.

FIG. 2 is a simplified representation of an embodiment of a device 1 of power transmission by electromagnetic coupling capable of simultaneously electrically powering a plurality of receivers (four in the present example).

Device 1 comprises a single generator 5 delivering an A.C. electric signal and, across generator 5, a succession of four resonant modules $25_i$, with i ranging from 1 to 4 in the present example, each comprising at least one capacitor and at least one conductive winding or inductance forming an antenna. In FIG. 2, the resonant modules appear in the form of blocks and, in particular, the capacitors and the antenna circuits are not shown. First and second terminals $A_1$ and $B_1$ of module $25_1$ are connected across generator 5, and first and second terminals of the other modules (respectively $A_2$ and $B_2$; $A_3$ and $B_3$; and $A_4$ and $B_4$) are connected to third and fourth terminals of the module of previous rank (respectively $C_1$ and $D_1$; $C_2$ and $D_2$; and $C_3$ and $D_3$).

Third and fourth terminals $C_4$ and $D_4$ of the last resonant module, that is, module $25_4$ in this example, are connected to a termination block 27. As will be explained in further detail hereafter, block 27 corresponds either to a short-circuit or to an open circuit, according to the type of resonant module used.

A resistor $R_g$, corresponding to the internal resistance of generator 5, connects generator 5 to terminal A1. It should be noted that resistor RE shown in FIG. 1 has not been shown in FIG. 2. In practice, this resistor is distributed in modules $25_i$ into resistors $R_{Ei}$ (not shown), each resistor $R_{Ei}$ corresponding to the specific resistance of antenna $L_{Ei}$ of module $25_i$. A possible impedance-matching resistor may further be provided in series with resistor $R_g$, between generator 5 and terminal A1, or distributed in modules $25_i$.

FIGS. 3A to 3E are electric diagrams showing embodiments of the resonant modules of the power transmission device of FIG. 2.

Figure 3A:
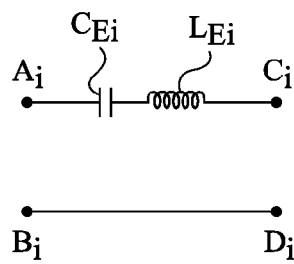
FIGS. 3A to 3E are electric diagrams showing alternative embodiments of a resonant module of the power transmission device of FIG. 2.

FIG. 3A illustrates an embodiment where the resonant module comprises, in series between first and third terminals $A_i$ and $C_i$, a capacitor $C_{Ei}$ and a conductive winding or inductance $L_{Ei}$ forming an antenna. Second and fourth terminals $B_i$ and $D_i$ of the module are interconnected. This embodiment corresponds to power transmission device 1A of FIG. 1. In this case, third and fourth terminals $C_i$ and $D_i$ of the last module in the succession are interconnected, that is, termination block 27 of FIG. 2 is a short-circuit.

Figure 3B:
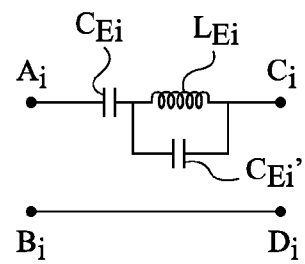

FIG. 3B illustrates another embodiment where the resonant module comprises the same elements as in the embodiment of FIG. 3A, and further comprises a second capacitor $C_{Ei'}$, connected in parallel with inductance $L_{Ei}$, providing an additional degree of adjustment. As in the embodiment of FIG. 3A, third and fourth terminals $C_i$ and $D_i$ of the last module in the succession are interconnected, that is, termination block 27 of FIG. 2 is a short-circuit.

Figure 3C:
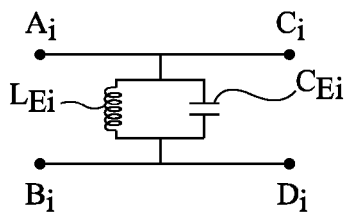

FIG. 3C illustrates another embodiment where the resonant module comprises, in parallel between first and second terminals $A_i$ and $B_i$, a conductive winding or inductance $L_{Ei}$ forming an antenna, and a capacitor $C_{Ei}$. First and third terminals $A_i$ and $C_i$ are interconnected, and second and fourth terminals $B_i$ and $D_i$ are interconnected. In this case, third and fourth terminals $C_i$ and $D_i$ of the last module in the succession are not connected, that is, termination block 27 of FIG. 2 is an open circuit.

Figure 3D:
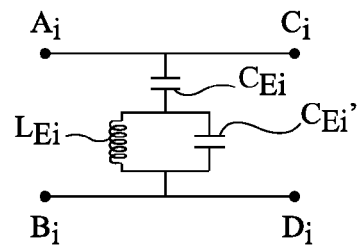

FIG. 3D illustrates another embodiment where the resonant module comprises the same elements as in the embodiment of FIG. 3C, and further comprises, in series with parallel association $L_{Ei}C_{Ei}$, a second capacitor $C_{Ei'}$, connected between terminal $A_i$ and the node common to inductance $L_{Ei}$ and to capacitor $C_{Ei}$, providing an additional degree of adjustment. As in the embodiment of FIG. 3C, third and fourth terminals $C_i$ and $D_i$ of the last module in the succession are not connected, that is, termination block 27 of FIG. 2 is an open circuit.

Figure 3E:
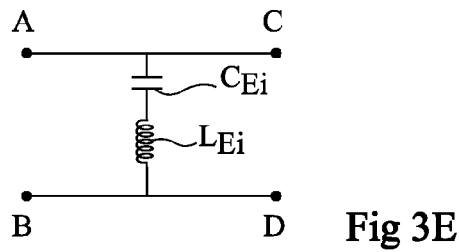

FIG. 3E illustrates another embodiment where the resonant module comprises, in series between first and second terminals $A_i$ and $B_i$, a capacitor $C_{Ei}$ and a conductive winding or inductance $L_{Ei}$ forming an antenna. First and third terminals $A_i$ and $C_i$ of the module are interconnected, and second and fourth terminals $B_i$ and $D_i$ are interconnected. In this case, third and fourth terminals $C_i$ and $D_i$ of the last module in the succession are not connected, that is, termination block 27 of FIG. 2 is an open circuit.

It will be within the abilities of those skilled in the art to provide other arrangements of the elements of the resonant module than those described in relation with FIGS. 3A to 3E. More generally, the provided device of power transmission by electromagnetic coupling comprises: a single generator providing an A.C. electric signal between two terminals; and a succession of resonant modules, each comprising at least one capacitor and at least one inductance, first and second terminals of a first module being connected across the generator, and first and second terminals of the other module(s) being connected to third and fourth terminals of the module of previous rank. In an embodiment, consecutive modules may be interconnected by a two-wire connection. A modular system which can be easily deployed and adapted to the user's needs is thus obtained.

In a power transmission device of the above-described type, the quantity of transferred power and the efficiency of the power transfer depend on the number of receivers present. Indeed, each receiver, when positioned opposite to a resonant module of the transmitter, provides a given impedance to the antenna circuit of the resonant module. When one or a plurality of receivers are absent, the general transmitter impedance is modified, which has an influence on the power transfer towards the remaining receivers. The sizing of the antenna circuits of the resonant modules of the transmit device is for example selected to obtain an optimal power transfer when all receivers are present.

As an example, for series-connected self-resonant LC assemblies of the type described in relation with FIG. 3A, the power transfer is optimal when:
where n is the number of resonant modules, is the pulse of the emitted electromagnetic $$\sum_{i=1}^{n} \frac{M_i^2 \omega}{L_{Ri}} \times Q_i = R_g + \sum_{i=1}^{n} R_{Ei},$$

field, $M_i$ is the mutual inductance between a resonant module of rank i and the receiver of same rank, and $Q_i$ is the quality factor of the receiver of rank i, with:

$$M_i = k_i \sqrt{L_{Ei} L_{Ri}},$$

$k_i$ being the coupling coefficient between the two antennas of rank i; and $$Q_i = \frac{R_{Ri}}{L_{Ri}\omega}.$$

For self-resonant LC assemblies connected in parallel of the type described in relation with FIG. 3C, the power transfer is optimal when:

$$\sum_{i=1}^{n} \frac{M_i^2 \omega}{L_{Ri} \times (L_{Ei}\omega)^2} \times Q_i = \frac{1}{R_g} + \sum_{i=1}^{n} \frac{1}{R_{Ei}}$$

It should be noted that the above-mentioned formulas correspond to a valid approximation when $Q_i \gg 1$ (in the case of a series association of the self-resonant assemblies), for example, $Q_i > 10$, and $k_i^2 Q_i \ll 1$ (in the case of a parallel association of the self-resonant assemblies), for example, $k_i^2 Q_i < 0.1$. Further, these formulas do not take into account possible impedance matching resistances.

When the self-resonant LC assemblies are series-connected, which corresponds to the examples described in relation with FIGS. 1, 3A, and 3B, the removal of one or a plurality of receivers causes a decrease in the sum of the impedances provided by the receivers to the transmit device. This results in an increase of the current flowing through the transmit device, and thus in an increase of the quantity of power transmitted to the remaining receivers. For example, in the case of a system of battery recharge by electromagnetic coupling, the remaining receive devices will be recharged faster.

When the self-resonant LC assemblies are connected in parallel, which corresponds to the examples described in relation with FIGS. 3C, 3D, and 3E, the removal of one or a plurality of receivers causes a decrease in the current flowing through the transmit device. This results in a decrease in the quantity of power transmitted to the remaining receivers, with, however, an increase of the power transfer efficiency.

An alternative embodiment may also provide control means for: measuring the current flowing through the transmitter and deducing therefrom the number of receivers present; accordingly adjusting the output characteristics of the generator, to maintain a constant power transfer towards the receivers, independently from the number of receivers present. Anyhow, even in the absence of certain receivers, all the antenna circuits of the resonant modules of the transmit device remain active and emit an electromagnetic field.

Figure 4:
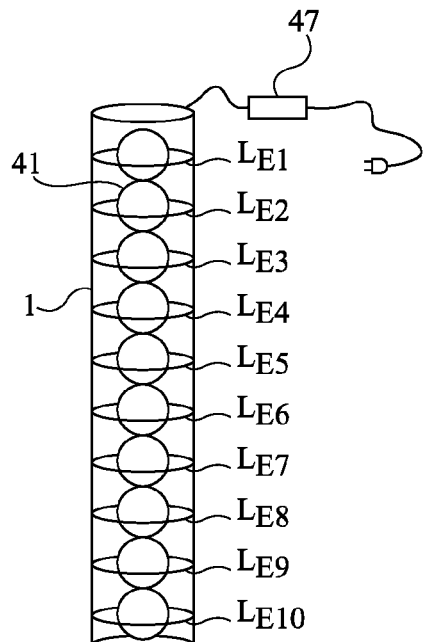
FIG. 4 schematically illustrates an embodiment of a system for electrically recharging luminous ornaments.

FIG. 4 schematically illustrates an embodiment of a system for electrically recharging luminous ornaments, comprising a power transmission device of the type described in relation with FIG. 2.

In this example, the receive devices are luminous balls 41, for example, balls made of translucent material, having light-emitting diodes (not shown) connected to a battery (not shown) arranged inside of them. Inside of each ball 41, an antenna circuit of the type described in relation with FIG. 1 (not shown in FIG. 4) is provided, to recharge the battery by electromagnetic coupling when ball 41 is positioned close to an adapted power transmission device 1.

In the shown example, power transmission device 1, or charger, has the general shape of a hollow cylinder or pipe capable of containing luminous balls 41 (ten balls in the present example). A circular conductive winding $L_{Ei}$ (with i ranging between 1 and 10 in the present example) having one or a plurality of spirals is formed around the internal or external wall of the pipe, or embedded in the pipe wall, at each location capable of receiving a luminous ball 41. Conductive windings $L_{Ei}$ form power transmission antennas. Antennas $L_{Ei}$ are connected to one another and to frequency-tuning capacitors according to an electric diagram of the type described in relation with FIGS. 3A to 3E. In FIG. 4, the frequency-tuning capacitors and the connections between windings $L_{Ei}$ have not been shown. In this example, power transmission device 1 further comprises a power supply package 47 intended to be connected to a power distribution network such as the mains. Package 47 may comprise various elements, for example, a voltage converter, an RF generator, an impedance matching resistor, etc.

Figure 5:
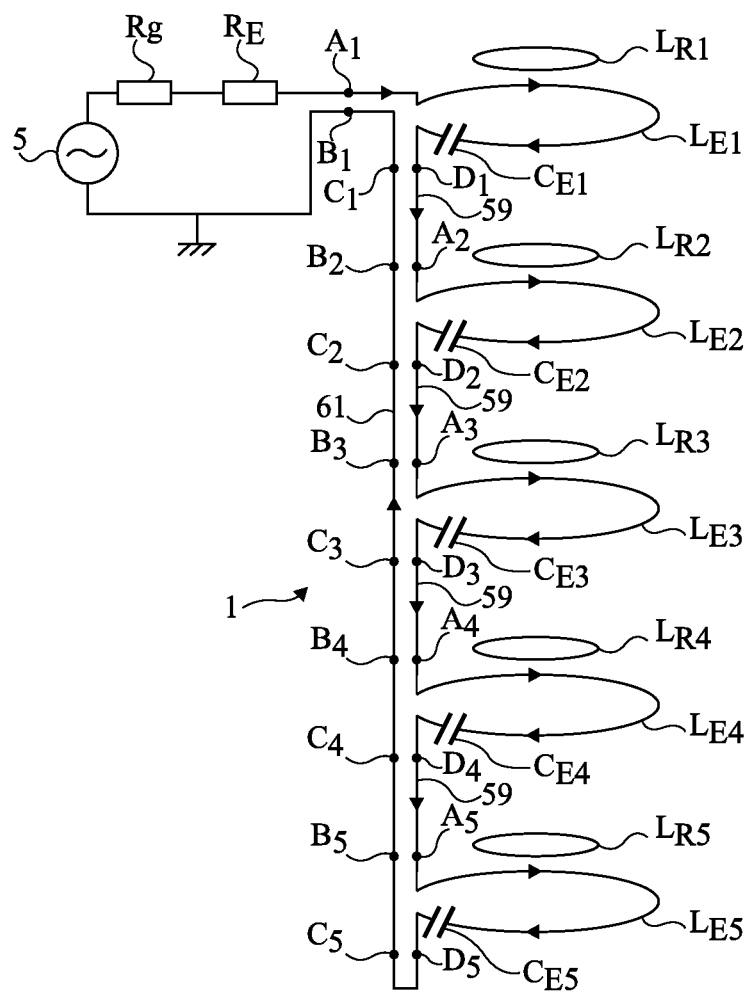
FIG. 5 is a more detailed simplified representation of a system for recharging luminous ornaments of the type described in relation with FIG. 4.

FIG. 5 is a simplified representation of a system for recharging luminous ornaments of the type described in relation with FIG. 4.

In this example, power transmission device 1 comprises five resonant modules and is capable of simultaneously recharging five luminous balls. For clarity, the cylinder or pipe capable of containing the luminous balls during their recharge has not been shown in FIG. 5. Each resonant module comprises a circular conductive winding $L_{Ei}$ (with i ranging from 1 to 5 in the present example) forming an antenna, in series with a capacitor $C_{Ei}$. The self-resonant LC assemblies are series-connected according to a layout of the type described in relation with FIG. 1. The succession of resonant modules is connected across an A.C. signal generator 5. A resistor $R_E$ (corresponding to the bringing together of the specific resistances of antennas $L_{Ei}$ and of a possible impedance matching resistance) is provided between the generator and the succession of resonant modules. A resistor $R_g$, series-connected with a resistor $R_{Ei}$ corresponds to the internal resistance of generator 5.

In FIG. 5, a circular conductive winding $L_{Ri}$ has been shown opposite to each of transmit antennas $L_{Ei}$. Windings $L_{Ri}$ correspond to the receive antennas of the luminous balls. For simplification, the other components of the luminous balls have not been shown in FIG. 5. As an example, on the transmit side, circular antennas $L_{Ei}$ are one-spiral windings, and on the receive side, circular antennas $L_{Ri}$ are two-spiral windings.

Circular transmit and receive antennas $L_{Ei}$ and $L_{Ri}$ are not necessarily in a same plane. However, for an optimal power transfer (in terms of quantity of transmitted power or of efficiency), receive antennas $L_{Ri}$ are preferably arranged in a plane parallel to the planes containing the corresponding transmit antennas $L_{Ei}$. Positioning means for maintaining the receive antennas in a predefined position with respect to the transmit antennas may be provided, to guarantee an optimal power transfer. The relative position of the transmit antennas with respect to the receive antennas is for example the same for all transmitter/receiver pairs. As an example, the positioning means may comprise mechanical positioning guide, for example, a flat area in the lower and upper portions of balls 41 (FIG. 4), to make sure that the receive antennas are properly directed with respect to the transmit antennas. In the example of FIGS. 4 and 5, the positioning means also comprise the pipe or hollow cylinder where the light balls are placed.

In a preferred embodiment, the system is sized so that the sum of the receiver impedances provided to the transmitter corresponds to the output impedance of the transmit circuit. The output impedance of generator 5 is for example 50 ohms.

To minimize stray capacitances, it is preferable to minimize the length of conductive wires 59 interconnecting the resonant modules, and of conductive wire 61 connecting the last resonant module to the generator.

To minimize stray inductances, it is preferable to decrease the distance between conductive wires 59 and conductive wire 61.

In an embodiment, it is provided to adjoin wires 59 and wire 61, to minimize stray inductances. Further, these wires are not twisted, which would increase their length, and thus stray capacitances.

Other embodiments may be provided. Wires 59 and 61 may for example be twisted to minimize the distance separating them and thus decrease stray inductances, or a coaxial cable may be used.

It should be noted that in the examples shown in FIGS. 4 and 5, the recharge system comprises one resonant module per luminous ball to be recharged. The described embodiments are however not limited to this specific case. As an example, the transmit device may comprise a number of resonant modules equal to the maximum number of luminous balls capable of being simultaneously charged, plus one. In this case, each ball is primarily coupled with a first resonant module, and is also coupled, with a lesser coupling coefficient, with at least one second resonant module. This enables to increase the efficiency of the power transfer towards luminous balls.

Figure 6:
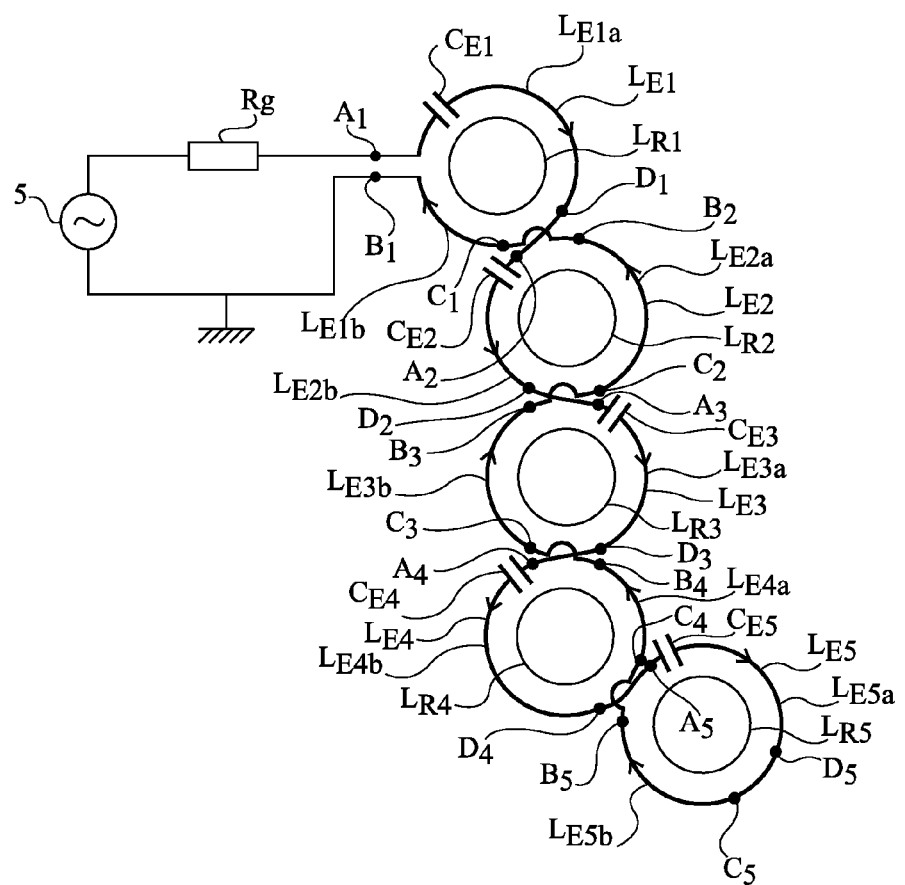
FIG. 6 is a simplified representation of another embodiment of a system for electrically recharging luminous ornaments.

FIG. 6 schematically illustrates another embodiment of a system for electrically recharging luminous ornaments, comprising a power transmission device of the type described in relation with FIG. 2.

The receive devices are for example luminous balls of the type described in relation with FIGS. 4 and 5.

In the shown example, power transmission device 1 comprises five resonant modules and is capable of simultaneously recharging five luminous balls. In this example, the power transmission device, or charger, has the shape of a tray capable of receiving luminous balls.

Each resonant module comprises a substantially planar winding or coil $L_{Ei}$ (i ranging from 1 to 5 in the present example), formed on a wall of the tray or embedded in the tray, and open in two points. As an example, each winding $L_{Ei}$ is a one-spiral winding open at two diametrically opposite points. In other words, each resonant module comprises two winding portions $L_{Eia}$ and $L_{Eib}$ forming transmit antenna $L_{Ei}$ of the module.

In the embodiment of FIG. 6, the resonant modules are appended two by two and connected so that the current flowing through the power transmission device flows, in the forward direction, through capacitors $C_{Ei}$ and through winding portions $L_{Eia}$ of the successive modules (from the first to the fifth module), and in the return direction, through winding portions $L_{Eib}$ of the successive resonant modules (from the fifth to the first module).

In the shown example, each resonant module comprises four terminals $A_i$, $B_i$, $C_i$ and $D_i$, and comprises, between terminal $A_i$ and terminal $D_i$, a capacitor $C_{Ei}$ in series with a first portion $L_{Eia}$ of winding $L_{Ei}$, and between terminal $C_i$ and terminal $B_i$, a second portion $L_{Eib}$ of winding $L_{Ei}$. In other words, winding $L_{Ei}$ is interrupted at a first point by capacitor $C_{Ei}$ and the opening between terminals $A_i$ and $B_i$, and at a second point by the opening between terminals $C_i$ and $D_i$.

Winding portions $L_{Eia}$ and $L_{Eib}$ of the successive modules are arranged so that the current flow direction in winding $L_{Ei}$ reverses for each module change with respect to the current flow in winding $L_{Ei}$ of previous rank. As an example, the current flows clockwise in winding $L_{E1}$, counterclockwise in winding $L_{E2}$, and so on. The direction of the field created by the windings thus reverses for each resonant module change (this field is always perpendicular to the tray but is now incoming, now outgoing, according to the rotation direction of the current).

An advantage of the embodiment of FIG. 6 is that the tray configuration enables to arrange the resonant LC circuits very close to one another, or even to place them adjacent to one another. This particularly results from the fact that parasitic couplings or interactions between the different resonant modules are much lower than in a cylinder configuration of the type described in relation with FIGS. 4 and 5. This enables to do away with all or part of the connections between modules, and with the stray inductances associated with such connections.

Another advantage is due to the remote electromagnetic signature of the power transmission device. Indeed, the total field seen outside of the device is the sum of the positive and negative contributions generated at the level of each resonant module. This field is smaller than in a structure of the type described in relation with FIGS. 4 and 5, where the contributions generated by the different resonant modules all have the same direction. This enables to minimize the emission of parasitic disturbances into the environment.

In FIG. 6, a circular conductive winding $L_{Ri}$ has been shown opposite to each of transmit antennas $L_{Ei}$. Windings $L_{Ri}$ correspond to the receive antennas of the luminous balls. For simplification, the other components of the luminous balls have not been shown. As an example, on the receive side, circular antennas $L_{Ri}$ are two-spiral windings. Circular transmit and receive antennas $L_{Ei}$ and $L_{Ri}$ are not necessarily in a same plane. However, for an optimal power transfer (in terms of quantity of transmitted power or of efficiency), receive antennas $L_{Ri}$ are preferably arranged in a plane parallel to the planes containing the corresponding transmit antennas $L_{Ei}$. Positioning means for maintaining the receive antennas in a predefined position with respect to the transmit antennas may be provided, to guarantee an optimal power transfer. As an example, the positioning means may comprise mechanical positioning guides, for example, a flat area in the lower and upper portions of the balls.

Other applications may of course be provided. For example, a power transmission device may be deployed in infrastructures such as bridges, roads, buildings, etc. to power sensors embedded in materials such as concrete or metal, and where it is difficult to achieve the electric power supply with a wire connection.

Another example of application relates to a device for monitoring a patient on a hospital bed. Probe- or sensor-type measurement devices may be placed on the patient and may be remotely supplied by means of a power transmission device fitting the patient's bed. This avoids wire connections between the patient and his/her environment (or between the patient's bed and its environment if the power transmission device is external to the bed).

Specific embodiments of the present invention have been described. Various alterations, modifications, and improvements will readily occur to those skilled in the art.

In particular, it will be within the abilities of those skilled in the art to adapt the above-described embodiments according to the number of receiver devices capable of being simultaneously remotely supplied.

Further, the invention is not limited to the specific examples described hereabove, where each receiver device is associated with a resonant module comprising a conductive winding forming an antenna, and conversely. Embodiments where the number of resonant modules and of receiver devices capable of being simultaneously remote-supplied are not identical may be provided. For example, a system where a resonant module of the power transmission device enables to remotely supply a plurality of receive devices or, conversely, a system where the power received by a receive device originates from a plurality of resonant modules, may for example be provided.

Further, in the above-described embodiments of power transmission devices, the possibility of providing an impedance matching resistor between the A.C. signal generator and the succession of resonant modules has been mentioned. Such a resistor is optional. Further, if an impedance matching is needed, it will be within the abilities of those skilled in the art to provide other impedance matching means, for example, an impedance transformer, between the generator and the succession of resonant modules. As a variation, a cable length specifically selected for impedance matching purposes may be added between the generator and the succession of resonant modules. The impedance matching resistor may further be distributed between the different self-resonant modules.

The invention claimed is:

1. A system of power supply by electromagnetic coupling comprising: a device for power transmission by electromagnetic coupling, comprising a single generator delivering an A.C. electric signal between two terminals; and a succession of resonant modules, each comprising a first capacitor and a first inductance, and first, second, third, and fourth terminals, the first and second terminals of a first module being connected across the generator, and the first and second terminals of the other module(s) being connected to the third and fourth terminals of the module of previous rank; and at least two receivers each comprising a resonant circuit comprising at least one capacitor and at least one inductance, wherein the at least two receivers are separate and non-coupled.

2. The system of claim 1, wherein, in the transmission device, two consecutive resonant modules are interconnected by a two-wire connection.

3. The system of claim 2, wherein, in the transmission device, said two-wire connection comprises a pair of adjoined wires.

4. The system of claim 2, wherein, in the transmission device, said connection comprises a twisted pair of wires.

5. The system of claim 1, wherein, in the transmission device, in each module, the first capacitor and the first inductance are series-connected between the first and third terminals, the second and fourth terminals being interconnected.

6. The system of claim 1, wherein, in the transmission device, in each module, the first capacitor and the first inductance are connected in parallel between the first and second terminals, the first and third terminals being interconnected, and the second and fourth terminals being interconnected.

7. The system of claim 1, wherein, in the transmission device, the successive modules are connected so that, in each module, the current flow direction in the inductance is different from the current flow direction in the inductance of the module of previous rank.

8. The system of claim 1, wherein, in each receiver, said resonant circuit is capable of providing electric power to a load, in the presence of an electromagnetic field emitted by the transmission device.

9. The system of claim 1, further comprising means for maintaining a predefined relative position between each receiver and the power transmission device, this position being selected according to the optimal coupling desired between the resonant circuit of the receiver and a resonant module of the power transmission device.

10. The system of claim 9, wherein said means comprise a wall in the shape of a hollow cylinder.

11. The system of claim 10, wherein said wall supports conductive windings forming the inductances of the resonant modules.

12. The system of claim 1, capable of recharging, by electromagnetic coupling, luminous ornaments.

13. The system of claim 1, wherein said power transmission device further comprises means for:
   measuring the current or the output voltage of said generator;
   deducing therefrom the number of receivers coupled to said device; and
   accordingly adjusting the output characteristics of said generator, to maintain a constant power transfer towards the receivers, independently from the number of receivers.

14. A use of the device of claim 1, for simultaneously electrically powering at least two loads.

* * * * *